(12) United States Patent
Kombowski (10) Patent No.: US 8,047,921 B2
(45) Date of Patent: Nov. 1, 2011

(54) VIBRATION DAMPING DEVICE, IN PARTICULAR A MULTISTAGE TORSION VIBRATION DAMPER

(75) Inventor: Eugen Kombowski, Buehl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 12/697,553

(22) Filed: Feb. 1, 2010

(65) Prior Publication Data

US 2010/0133061 A1 Jun. 3, 2010

Related U.S. Application Data

(63) Continuation of application No. PCT/DE2008/001116, filed on Jul. 7, 2008.

(30) Foreign Application Priority Data

Aug. 2, 2007 (DE) .......................... 10 2007 036 194

(51) Int. Cl.
*F16F 15/121* (2006.01)
(52) U.S. Cl. .................................... 464/68.8
(58) Field of Classification Search .................. 464/68.8, 464/68.7; 192/212.2–212.22
See application file for complete search history.

(56) References Cited

U.S. PATENT DOCUMENTS

| | | | | |
|---|---|---|---|---|
| 4,557,702 A | * | 12/1985 | Takeuchi | ............. 192/213.22 X |
| 4,596,324 A | * | 6/1986 | Braun | |
| 4,944,499 A | | 7/1990 | Tojima | |
| 5,135,092 A | * | 8/1992 | Jackel | .................. 192/213.22 X |
| 5,163,875 A | * | 11/1992 | Takeuchi | ............. 192/213.22 X |
| 5,246,399 A | * | 9/1993 | Yanko et al. | .............. 464/68.7 X |
| 5,609,526 A | | 3/1997 | Kitayama et al. | |
| 2004/0185940 A1 | | 9/2004 | Yamamoto et al. | |
| 2004/0216979 A1 | | 11/2004 | Yamashita et al. | |

FOREIGN PATENT DOCUMENTS

| | | |
|---|---|---|
| DE | 3047039 | 9/1981 |
| DE | 19522225 | 1/1996 |
| DE | 19920542 | 11/1999 |
| EP | 1698798 | 9/2006 |

* cited by examiner

*Primary Examiner* — Gregory Binda
(74) *Attorney, Agent, or Firm* — Simpson & Simpson, PLLC (57) ABSTRACT

A vibration damper, for example, a multistage torsion vibration damper, including at least two damper assemblies, connected in series and arranged coaxially, a first damper assembly forming a primary damping stage and a second damper assembly forming a pre-damping stage. The damper assembly that forms the primary damping stage is configured as a series damper including at least two dampers connected in series and is located on a larger diameter in the radial direction than the second damper assembly that forms the pre-damping stage. A multistage vibration damper, including at least two damper assemblies located in series, a first damper assembly forming a preliminary damper and a second damper assembly stage is configured as a series damper including at least two dampers connected in series and is located on a larger diameter in the radial direction than the second damper assembly that forms the preliminary damping stage.

11 Claims, 4 Drawing Sheets

VIBRATION DAMPING DEVICE, IN PARTICULAR A MULTISTAGE TORSION VIBRATION DAMPER

CROSS-REFERENCE TO RELATED APPLICATIONS

This application is filed under 35 U.S.C. §120 and §365(c) as a continuation of International Patent Application PCT/DE2008/001116, filed Jul. 7, 2008, which application claims priority from German Patent Application No. DE 10 2007 036 194.9, filed on Aug. 2, 2007, which applications are incorporated herein by reference in their entireties.

FIELD OF THE INVENTION

The invention relates to a vibration damper, for example, a multistage torsional vibration damper, including at least two damper assemblies, connected in series and arranged coaxially, a first damper assembly forming a primary damping stage and a second damper assembly forming a pre-damping stage.

BACKGROUND OF THE INVENTION

Vibration damping devices, for example provided as multistage torsion vibration dampers, are known in the art in many embodiments. When disposed in a drive train, they function, viewed in the direction of the force flow, as an elastic clutch between an input and an output and are coupled to the connection elements forming the input and the output. The device transfers torque and simultaneously compensates vibrations occurring during power transmission. Also, an embodiment as an absorber is conceivable. In this case, the device does not transfer any torque between the adjacent connection elements, but only torque spikes are reduced through the particular components. Such vibration damping devices are based on different functional principles depending on the type of damping. Besides purely mechanical damping solutions also hydraulic damping solutions and combined mechanical-hydraulic damping solutions are known. Mechanical dampers include a rotating component which can have one or several components and which functions as an input component or output component of the vibration damper depending on the direction of the force flow, particularly a primary component and a secondary component which are disposed coaxial to one other and which are rotatable within limits in circumferential direction relative to one another. The coupling between the input component and the output component is performed through torque transfer devices and vibration damping devices which are typically formed by spring units and which include at least one spring element provided as a compression spring. Vibrations can be compensated and reduced through the size of the relative rotation angle between the input component and the output component and the spring force.

From the printed document DE 30 47 039 A1 an embodiment of a device of this type for damping vibrations and for transmitting torque between an input and an output is known which includes two damper assemblies connected in series. In order to facilitate a larger relative movement between the driving and driven elements of the vibration damper, the device is provided with two stages. Thus, the device includes two concentric circles of damping springs which are configured in a housing and which are driven by drive lugs which are mounted in a drive element, e.g. a piston plate for a lock up clutch. Thus, floating elements separate the springs in the inner and outer spring circles into two or more groups of springs. Thus, the two or more groups of springs function in parallel to one another in each circle, while the springs in each group function in series. Thus, the power transfer in the force flow is performed in series. The output component formed by side disks of the first radially outer damper assembly is connected torque proof to the input component of the second damper assembly. Thus, the configuration of the device is very complex and requires a large amount of installation space.

Another embodiment of a series damper for use in force transmission devices with a hydrodynamic component, like e.g. a hydrodynamic torque converter or a hydrodynamic clutch or a lockup clutch, is known from the printed document DE 199 20 542 A1. The vibration damper can thus be connected in series to the hydrodynamic component and also to the lockup clutch, or it can only be connected in series with the lockup clutch. The vibration damping device is configured at least as a two-stage series damper including a primary damping stage and a pre-damping stage. The damper assembly of the pre-damping stage is disposed radially on the larger diameter than the damper assembly of the primary damping stage, which is particularly offset in radial direction in direction towards the direction of rotation. The particular embodiments with pre-damper assembly and primary damper assembly are characterized by an axial offset viewed in installed position. Furthermore, the relative rotation angle of the damper assembly is mostly limited for the primary damper stage due to the small diameter of the reference circle.

From the printed documents U.S. Patent Application No. 2004/0216979 A1 and U.S. Patent Application No. 2004/0185940, embodiments of parallel dampers are known. From the printed document U.S. Patent Application No. 2004/0216979 A1 an embodiment of a vibration damper is known including at least two damper assemblies which are connected in parallel. Both damper assemblies are effective continuously. The damper assembly for the smaller rotation angles is disposed on a radially inner diameter, while the greater rotation clearance is implemented through the second damper assembly on a radially outer diameter. The radially inner damper assembly is configured as a series damper, including spring elements separated by a single component flange and connected in series.

From the printed document U.S. Patent Application No. 2004/0185940 a vibration damping device is known which is configured as a series—parallel damper including a first rotating element and a second rotating element which are rotatable relative to one another within limits. Furthermore, the device includes a pair of first elastic elements oriented in one rotation direction and connected in series, which are coupled through a floating intermediary flange and another second elastic element, which is connected in parallel to the first elastic elements. The second elastic element is configured, so that it is compressed in the rotation direction after the pair of first elastic elements is compressed to a first angle due to a relative rotation of the first rotating element and the second rotating element. For this purpose a free angle is associated with the second elastic element, which free angle in integrated in the rotating flange. The disposition of first and second elastic elements is provided overlapping for reducing the radial installation space to one diameter or in radial direction with respect to the annular portions theoretically created through the extension of the spring elements. The coupling between the first elastic elements is performed through a floating flange.

All cited embodiments have in common that the spring characteristic is adapted with respect to a desired property in a particular operating range.

BRIEF SUMMARY OF THE INVENTION

The object of the invention is to provide a vibration damper, through which a spring characteristic can be defined, which is characterized by a small rise in the range of a small relative rotation angle, which is effective in this range also over a larger torque range, and which facilitates a larger relative rotation angle range in the primary damper stage. The spring constant is kept as low as possible. The solution according to the invention is characterized by low design complexity and minimum size and further is suitable for integrating force transmission devices for applications in drive trains.

A vibration damper, for example, a multistage series torsion vibration damper, includes at least two damper assemblies configured in series, a first damper assembly configured as pre-damper stage and a second damper assembly configured as primary damper stage. According to the invention, the primary damper stage is formed by a damper assembly configured as a series damper, including at least two dampers connected in series. The damper assembly forming the primary damper stage is disposed on a larger diameter in radial direction than the damper assembly forming the pre-damping stage.

The term "primary damper stage" in the sense of this application includes the effect of the damper assembly, which comes to bear at least in the range of large torques and large relative rotation angles, for example, over the entire rotation angle range. The term "pre-damper stage" in the sense of this application includes the effect of the damper assembly, which comes to bear at least in the range of small torques and small relative rotation angles, and which is effective in addition to the damper assembly of the main damper stage in this range, which determines the relative rotation range until the damper assembly is locked up or the spring units are blocked, so that the spring forces of the two damper stages add up.

The solution according to the invention facilitates providing multistage damper assemblies. The damper assembly forming the primary damper stage includes a relatively large relative rotation angle in its entirety while adding the spring forces based on the series connection.

According to one embodiment, the damper assembly of the primary damper is disposed in radial direction on the outside, this means on the larger diameter, and the damper assembly of the predamper is disposed in radial direction on the inside, this means as close as possible to the axis of rotation. Main damper assemblies and predamper assemblies are disposed coaxial relative to one another, and can be disposed in axial direction with an offset or, for example, in a plane. In the latter case, the damper assembly in the form of a multistage damper, in which the damper characteristic can be variably adjusted based on the separate configuration of the particular damper assemblies, is configured as small as possible in axial direction and also in radial direction.

Due to the configuration of the primary damper on the outside in radial direction, it can accommodate large relative angles of rotation. The main damper is effective in this relative rotation range, and thus the damping is also possible for higher moments.

In one embodiment, the series damper includes at least two dampers connected in series, a first and a second damper. One respective output component of one damper forms the input component of the other damper, or is coupled torque proof therewith. According to one embodiment, the dampers of the series damper are disposed on one diameter. In this case, the radial dimensions for the damper assembly can be kept small.

According to another embodiment, also disposing the two dampers of the first damper assembly on two different diameters is feasible. In this case, the particular transmission elements for the particular dampers can be configured differently.

Each of the damper assemblies viewed in force flow direction includes a primary component functioning as an input component and a secondary component functioning as an output component. The function can be reversed depending on the force flow direction and alternates. Thus, the input and output components can be configured integral or with multiple parts. In one embodiment, respective integral embodiments in disk shape are selected. They are coupled with one another through torque transfer devices and damping coupling devices. The torque transfer devices and damping coupling devices are formed herein by elastic elements, particularly spring elements. Thus, the particular spring units are configured as spring units nested into one another. Thus, the particular damper assembly can respectively function as an elastic clutch, which transfers torque and simultaneously compensates vibrations. The damper assembly of the main damper includes at least an input component and also an output component. The output component simultaneously forms the input component of the predamper assembly or is coupled torque proof therewith. In one embodiment an integral embodiment of the output component of the damper assembly of the primary damper stage and the input component of the damper assembly of the predamper stage is selected. In this case, a particularly installation space optimized configuration of the particular damper assemblies in an axial plane relative to one another is possible. Depending on the configuration of the main damper assembly, particularly in the form of a series damper made of at least two dampers, it is implemented in a different manner. The coupling between the two dampers of the damper assembly of the main damper stage is performed in the simplest case through a radially outer intermediary flange. It can be configured as an annular element, which includes protrusions in the portion of its inner circumference, which protrusions are oriented in radial direction towards the axis of rotation, which protrusions form contact surfaces viewed in circumferential direction or stop surfaces for the particular spring elements.

This intermediary flange, depending on the force flow induction, either forms the input component of the first damper assembly or is provided as a floating flange, which is not supported separately but only fixated based on the positional association of the remaining components of the damper assembly in its position between the spring elements of the two dampers. Through the intermediary flange, at least one spring unit is loaded, which is supported in circumferential direction at one of the two dampers. The respectively opposite end portion of the spring unit is supported on the other side at an inward disposed flange. The inward disposed flange is also configured as an annular element, and includes protrusions offset from one another at uniform distances in circumferential direction, which extend in radial direction from the rotation axis and which form contact surfaces oriented in circumferential direction for the spring elements. The damper assembly of the primary damper stage thus can include two side disks offset from one another in axial direction, and flanges disposed there between, which are configured as annular elements, and which include protrusions. The spring unit made of a radially outer- and a radially inner flange is thus divided. The spring units of the two dampers are respectively supported at the intermediary flange and at the flange. Additionally, a support at the flange portions of the side disks, which flange portions are oriented in circumferential direction is possible. This embodiment analogously also applies to the damper assembly of the predamper stage. The predamper stage, however, is only configured as a simple damper, including a plurality of spring units disposed in parallel. Also here, an embodiment as a series damper is feasible.

Depending on the association and coupling or connection in a force transmission unit, the different elements can respectively function as input components. This depends on which elements viewed in force flow direction are coupled with the input side and which are coupled with the output side.

In one embodiment, the input and thus the force induction at the first damper assembly can be implemented through lateral disks. In this case, they are coupled at least indirectly torque proof with a driving element, e.g. a force transmission device of a lockup clutch, and/or an element of a hydrodynamic component. The power transmission is then performed through the first damper of the first damper assembly to the intermediary flange and from the intermediary flange onto the second damper, and then onto the flange, which is simultaneously coupled to the input component of the damper assembly of the predamper stage or, for example, forms this input component. The output component of the damper assembly of the predamper stage is then formed, in this case, for example, by a side disk assembly.

In one embodiment, it is also feasible to induct the power through the intermediary flange. In this case, the power transmission is performed onto the flange and from the flange onto the side disks of the first damper assembly. The side disks are in turn coupled torque proof with the input component of the damper assembly of the predamper stage, which can be formed by an intermediary flange or, for example, by side disks configured integrally with the side disks of the damper assembly of the primary damper stage, when the predamper stage is configured as a series damper. The possibilities of the integral embodiment of the side disks of both damper assemblies and of the one component flange associated with both damper assemblies is characterized by a high degree of functional concentration and minimum installation space requirement.

The latter embodiment has the advantage that through the connection of the intermediary flange of the first damper assembly, which flange then is not a floating intermediary flange anymore but fixated through the connection with respect to its position in a force transmission device, connection plates with any geometry can be used, which, for example, the entire assembly like a bell, and thus provide a type of encapsulation of the damper device.

The solution according to the invention is not limited to the described embodiments. Design features are at the discretion of a person skilled in the art. It is crucial that a multistage damper assembly can be implemented through a pure series damper assembly from at least one primary damper configured as a series damper, which damper assembly is characterized by short coil springs in the main damping portion, and thus an unlocking as known from long springs is avoided and simultaneously larger torques can be transferred through the main damper at a lower relative rotation angle.

BRIEF DESCRIPTION OF THE SEVERAL VIEWS OF THE DRAWING

The solution according to the invention is subsequently described with respect to drawing figures, wherein.

DETAILED DESCRIPTION OF THE INVENTION

Figure 1A:
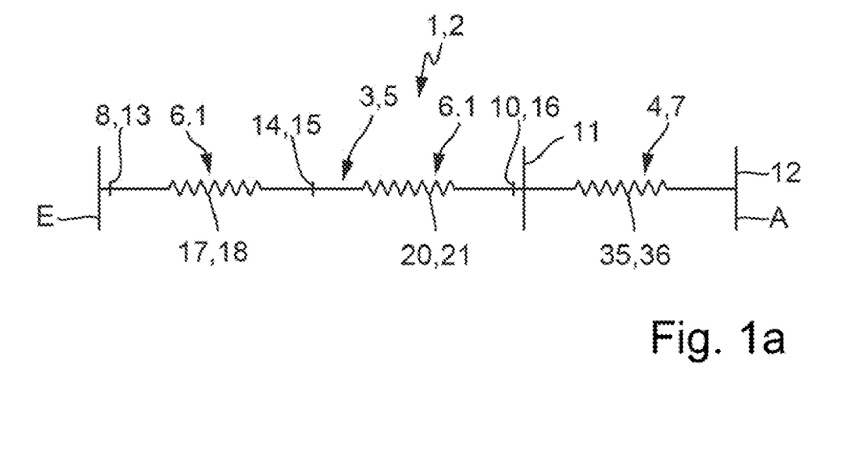
FIG. 1a illustrates the basic configuration and the basic principle of a vibration damping device according to the invention in a simplified schematic depiction.

FIG. 1a illustrates the basic configuration and the basic principle of a vibration damping device according to the invention in a simplified schematic depiction, for example, of a torsion vibration damper. The vibration damper device 1 functionally includes two damper stages 3, 4, respectively formed by a damper assembly, a first damper assembly 5 and a second damper assembly 7, and which are connected in series. This means, that the power transmission is thus performed in the force flow in series, this means subsequent to one another.

The first damper stage 3 is designated as primary damper stage. The second stage 4 forms the pre-damper stage. The primary damper stage 3 thus is effective in the main operating range, this means the maximum relative rotation angle range, while the predamper stage 4 is only effective in a limited relative rotation angle range as a partial range of the entire operating range. The additional damping after locking up the predamper stage 4 is only performed in the primary damper stage. The particular damper stages 3 and 4 are thus implemented by damper assemblies 5, 7, which are coupled to one another, or which are in operative engagement. The first damper stage 3 is formed by a damper assembly 5, which is configured as a series damper from at least two dampers 6.1 and 6.2 connected in series. The predamper stage 4 is formed by a damper assembly 7. Both damper assemblies 5 and 7 are combined in series to form a two-stage series damper. Each of the particular damper assemblies 5 and 7 includes input and output components, viewed in force flow direction, which are configured integrally or in several parts, which are coupled with one another through torque transmission devices and/or damping coupling devices. This also applies for the particular dampers 6.1, 6.2 of a damper assembly 5 configured as a series damper. Thus, the input and output components of the particular dampers 6.1, 6.2 of a damper assembly 5 or of the damper assemblies 5, 7 are disposed respectively coaxial to one another, and rotatable relative to one another in circumferential direction within limits. The terms "input" and "output" components thus relate viewed in force flow direction to the force flow when disposed in a drive train. The force flow goes through the vibration damper device 1. The functions can be associated with different components in different operating states.

The device 1 viewed in force flow direction in its entirety includes an input component E and an output component A.

The input component E is thus formed depending on the force flow direction either by an element of the damper assembly 5 or of the damper assembly 7. The damper assembly 5 includes an input component 8 and an output component 10, which is in turn connected torque proof with an input component 11 of the damper assembly 7, or forms a unit therewith. The damper assembly 7 furthermore includes an output component 12, which corresponds to the output component A of the vibration damper device 1, when the vibration damper device 1 is disposed between a drive motor and a power transmission unit, which output component is at least indirectly connected to the subsequent power transmission unit. The damper 6.1 of the first damper assembly 5 includes an input component 13, which is formed by the input component 8 of the damper assembly 5, and an output component 14, which forms the input component 15 of the damper 6.2, and which is connected torque proof therewith. The second damper 6.2 furthermore includes an output component 16 which forms the output component 10 of the damper assembly 5. The first damper 6.1 includes devices 17 for torque transmission between the input component 13 and the output component 14 and damping coupling devices 18. Analogously, also the second damper includes torque transmission devices 20 and damping coupling devices 21. The second damper assembly 7 includes a damper, in which the input component 11 and the output component 12 are coupled with one another through torque transmission devices 35 and damping coupling devices 36. The force flow is performed between the input component E and the output component A of the device 1 depending on the direction of rotation, through the dampers 6.1, 6.2 or 6.1 and the damper 7.

Figure 1B:
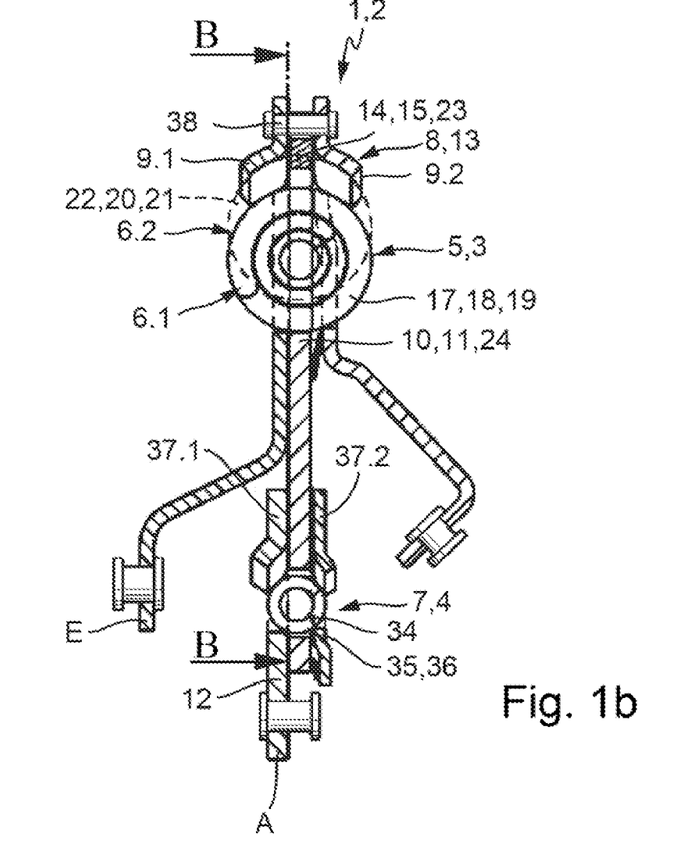
FIGS. 1b and 1c illustrate a vibration damping device according to the invention as a two-stage series vibration damper according to a first embodiment in a simplified schematic depiction with reference to two views, particularly an axial sectional view and a view B-B according to FIG. 1b.
Figure 1C:
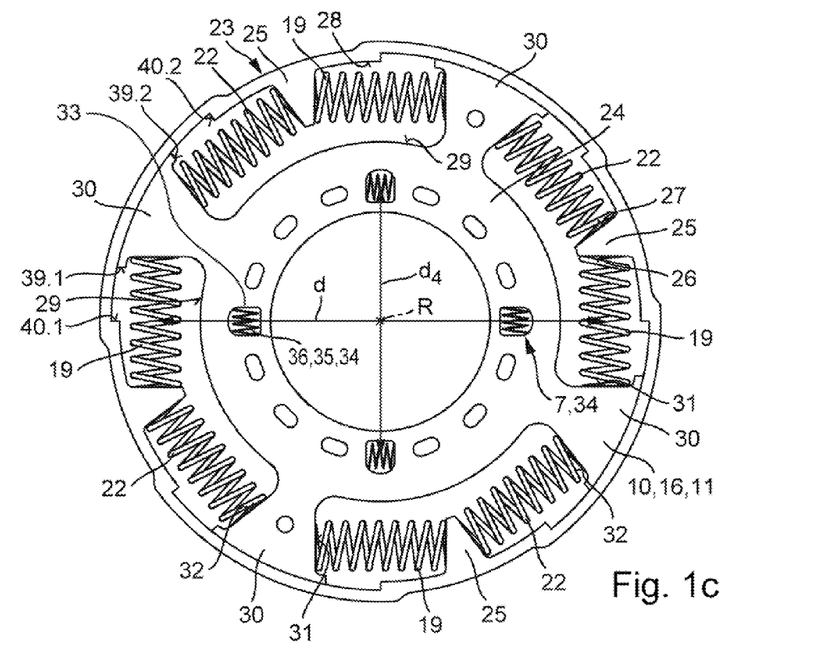

The FIGS. 1b and 1c illustrate a vibration damping device 1 configured according to the invention, for example, a multistage series damper 2 in two views according to a first embodiment. FIG. 1b illustrates the vibration damping device 1 in an axial sectional view, FIG. 1c illustrates a view B-B according to FIG. 1b. The arrangement of the first damper stage 3 is performed in radial direction with reference to the rotation axis R of the device 1 on a larger diameter than the arrangement of the additional second damper stage 4 functioning as a predamper stage. Thus, also the disposition of the first damper assembly 5 is performed on the radial outside, while the disposition of the second damper assembly 7 is performed within the extension of the inner diameter of the first damper assembly 5 and thus on a smaller diameter. The damper assembly 5 includes an input component 8, which is formed by two drive disks 9.1 and 9.2, which are offset from one another in axial direction, and disposed coaxial to one another and coupled to one another torque proof. The output component 10 is disposed between the drive disks 9.1 and 9.2, which output component is in turn connected torque proof with an input component 11 of the damper assembly 7, or, for example, forms a unit therewith. The damper assembly 7 furthermore includes an output component 12, which corresponds to the output component A of the vibration damping device 1 when the vibration damping device 1 is disposed between a drive engine and a power transmission unit, which output component is at least indirectly connected to the subsequent power transmission unit.

The first damper assembly 5 includes two dampers 6.1 and 6.2. The numbering of the input and output components to FIG. 1a is maintained. The first damper 6.1 includes devices 17 for torque transmission between the input component 13 and the output component 14 and damping coupling devices 18. The devices 17 and 18 are formed herein by a unit, for example, a spring unit 19. Analogously, also the second damper 6.2 includes torque transmission devices 20 and damping coupling devices 21, which are formed by an additional spring unit 22. As discussed supra, the input component 13 is formed by the drive disks 9.1 and 9.2, the output component 14 is formed by an intermediary flange 23. The devices 17 and 18 or the particular spring units 19 are supported at the drive disks 9.1 and 9.2 or the flange 24 and the intermediary flange 23, while the spring units 22 of the second damper 6.2 can also be supported at the drive disks 9.1, 9.2 or the intermediary flange 23 and the flange 24 or the output component 12 in circumferential direction.

The intermediary flange 23 is configured in the first embodiment of the invention as a floating flange, this means it does not have a support of its own, and it is only supported and guided by the spring units 19, 22, and the configuration of the flange 24 or the side disks 9.1 and 9.2 between the spring units 19, 22.

The intermediary flange 23 is configured as an annular element, which includes protrusions 25 at its inner circumference oriented in the direction towards the rotation axis R, which protrusions form stop surfaces 26 and 27 for the spring units 19 or 22 of the dampers 6.1 and 6.2.

In the embodiment illustrated in FIG. 1c, the intermediary flange 23 is a radially outer intermediary flange, which includes the protrusions 25 equally spaced in circumferential direction at its inner circumference 28. The flange 24, which forms the output component 10 of the damper assembly 5 for the main damper stage 4, is configured as a radially inner flange and includes at its outer circumference 29 protrusions 30 extending outward in radial direction, this means away from the rotation axis R and disposed in circumferential direction at an even distance to one another. Two adjacent protrusions 30 define recesses extending in circumferential direction and open towards the rim, in which recesses the two spring units 19 and 22 of the particular damper assemblies 6.1 and 6.2 are disposed, and are supported at the opposing side surfaces 31 and 32 of such a recess at the flange 24. The flange 24 includes recesses 33 on its diameter $d_4$ for the predamper stage, which recesses are provided in the form of circumferentially extending openings, which form support surfaces for the spring units 34 of the torque transmission devices 35 or 36 for damping coupling. The support surfaces also face each other in circumferential direction. Furthermore, the spring units 34 are supported at the output component 12 provided in the form of side disks 37.1 or 37.2, which output component is only illustrated in FIG. 1b and which can be coupled with the subsequent power transmission device.

In this embodiment, a moment is inducted into the damper assembly 5 when used in drive trains in vehicles in normal fraction operation in the force flow from the drive engine to a subsequently positioned power transmission unit viewed through the drive disks 9.1 and 9.2, which are connected with one another torque proof. The spring units 19 or 22 are loaded according to FIG. 1c, depending on the direction of rotation, and in turn load onto the intermediary flange 23, for example, the protrusion 25, through the stop surfaces 26, and based on the coupling caused thereby with simultaneous damping coupling, the spring unit 22 impacts the flange 24 and in turn the spring unit 34 as an elastic coupling transmits the torque to the output component 12 in the form of the side disks 37.1 and 37.2. Thus, due to the radially inward disposition of the predamper and the embodiment of the spring units 34, the predamper stage in the form of the damper assembly 7 is only configured for small relative rotation angles, and thus for small torques, so that the damper assembly 7 is locked up starting at a certain rotation angle or the spring units are blocked and the main portion of the damping work is done by the primary damper provided in the form of the damper assembly 5, which is implemented by substantially larger relative rotation angles α. The damper assembly 5 of the main damper stage 3 with the particular spring units 19 and 22 of the particular dampers 6.1, 6.2 is configured so that it includes, for example, relatively short cylindrical coil springs.

Providing the torque proof coupling between the drive disks 9.1 and 9.2 of the damper assembly 5 functioning as main damper can be performed differently. In the illustrated embodiment, fastener elements 38 are provided, for example, in the form of rivets. These can be disposed radially outside of the radial extension of the spring units 19, 22 of the main damper stage 3 as illustrated in FIG. 1b. Furthermore, the assembly can be disposed radially outside of the intermediary flange 23. This torque proof coupling can simultaneously form a stop for the intermediary flange 23 or the flange 24.

Also, the torque proof coupling in the portion of the damper assembly 7 in the form of the predamper can either be provided radially outside or alternatively within the spring units 34 between the side disks 37.1 and 37.2 and the flange 24 of the pre-damper.

The embodiment according to FIGS. 1b and 1c furthermore illustrates an embodiment of the particular damper stages 3 and 4 in an axial plane, which is, for example, implemented by the configuration of the output component 10 of the first damper assembly 5 or of the input component 11 of the damper assembly 7. In the simplest embodiment, this component is configured as a disk shaped element. Other embodiments are conceivable, e.g. with an offset in axial direction. The embodiment illustrated in FIG. 1, however, represents a one embodiment with respect to the installation space requirements. This applies analogously also for the disposition of the two dampers 6.1 and 6.2 in radial direction and also in axial direction relative to one another. These are disposed in radial direction, for example, without an offset on a common diameter d and in one plane in axial direction. Thus, the series damper assembly can include a high degree of functional concentration.

The protrusions 30 of the flange 24 include stop surfaces 39.1, 39.2 at their outer circumference oriented in circumferential direction, which stop surfaces can interact with stop surfaces 40.1, 40.2 accordingly configured at the inner circumference 28 of the intermediary flange 23, and aligned in circumferential direction opposite to the stop surfaces 39.1, 39.2. They form a blocking protection for the spring units 19, 22. The stop surfaces 39.1, 39.2, 40.1, 40.2 are therefore configured so that they only form a rotation angle limiter between the intermediary flange 23 and the flange 24 at a particular predefined spring travel.

Figure 2A:
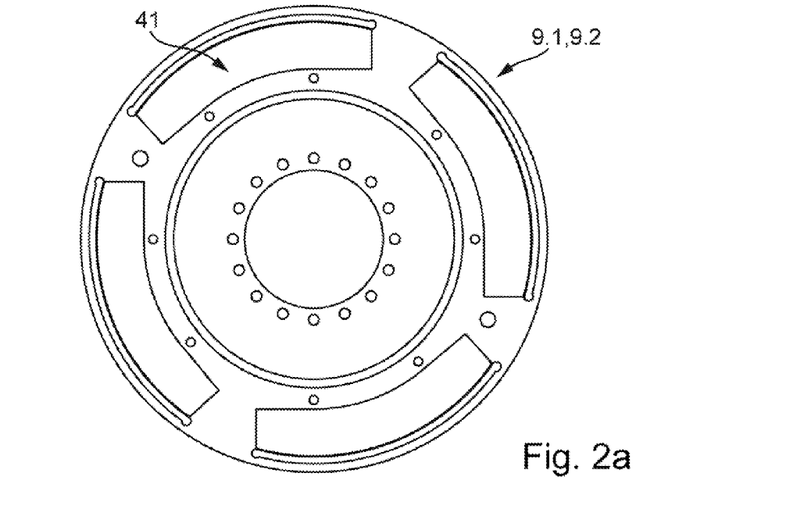
FIG. 2a illustrates the embodiments of the side disks of the first damper assembly in a side view.
Figure 2B:
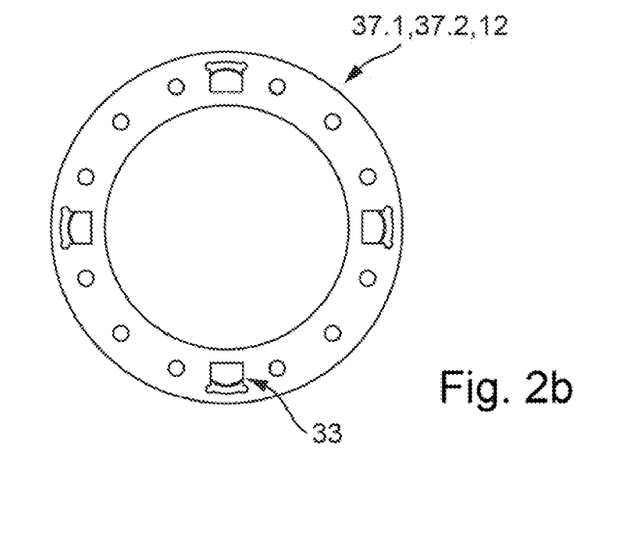
FIG. 2b illustrates the embodiment of the side disks of a second damper assembly in the first embodiment in a side view.

FIG. 2a thus illustrates the side disks in the form of drive disks 9.1 and 9.2 of the vibration damping device 1 according to FIG. 1 in a simplified schematic illustration. A disk shaped configuration with openings 41 provided in circumferential direction for receiving the spring units 19 and 22 of the dampers 6.1 and 6.2 for support in circumferential direction and in radial direction are also visible here. Analogously thereto, FIG. 2b illustrates the configuration of the side disks 37.1, 37.2 not illustrated in FIG. 1b of the predamper provided as a damper assembly 7. Also, these are configured disk shaped and include openings 33 extending in circumferential direction on the diameter of the spring unit 34, which openings are, for example, configured at constant distances from one another, and respectively form stop surfaces for the spring unit 34, disposed opposite to one another.

Figure 3:
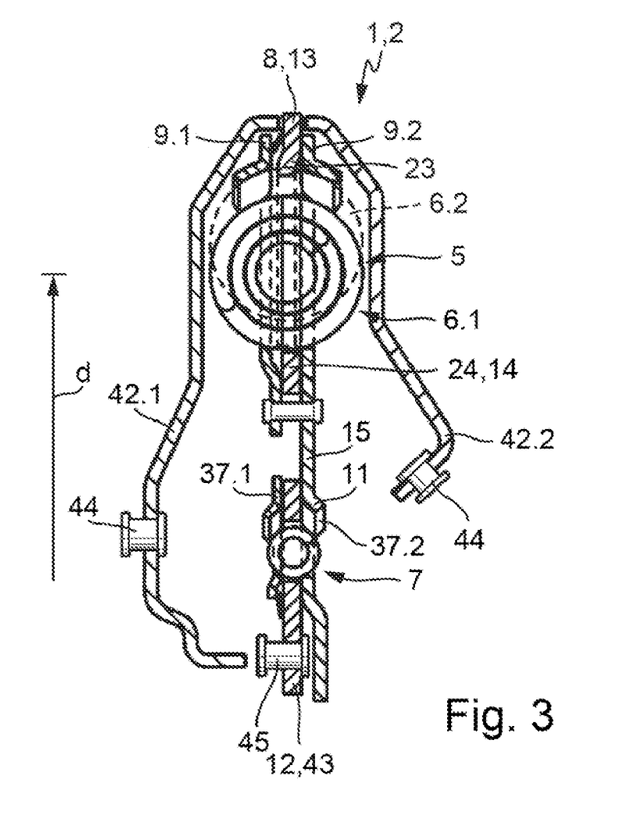
FIG. 3 illustrates a vibration damper device according to the invention configured as a two-stage series vibration damper according to a second embodiment in a simplified schematic depiction.

FIG. 3 illustrates an embodiment of a vibration damping device 1 according to a second embodiment. In this embodiment, another association of the elements side disks 9.1, 9.2 and flange 23 are selected, so that herein the functions with respect to the embodiment as input component E and output component A are exchanged compared to the embodiment illustrated in FIG. 1. Also, in FIG. 3, the vibration damping device 1 is characterized by two damper stages 3 and 4. The predamper stage is formed by the second damper stage 4, and the first damper stage is formed by the damper assembly 5. The damper assembly 5 is configured as a series damper from two dampers 6.1 and 6.2. Also here, the two dampers 6.1 and 6.2 are, for example, disposed on a common diameter d, and without offset from one another in radial and in axial direction. Furthermore, the damper assembly 7 forming the predamper stage 3 is disposed radially within the damper assembly 5 and in axial direction in the same plane, this means without an offset in installed position. Thus, also here, a particularly compact multistage damper assembly is implemented, which is configured as a series damper assembly when viewed in the entire system. Contrary to FIG. 1, the functions with respect to input and output components are exchanged here. Thus, the input is performed through the intermediary flange 23 of the primary damper, this means of the damper assembly 5. The intermediary flange thus forms the input component E of the device 1 and the input component 8 of the main damper assembly or the input component 13 of the first damper 6.1 or 15 of the second damper 6.2. The output or the output component 14 of the first damper 6.1 or the output component 16 of the second damper 6.2 is then formed by a floating flange 24, which is configured here as a radially inner flange, and through which the force flow is conducted respectively to the other damper 6.2 or 6.1.

As recited supra, the drive disk is formed by the main flange 23, which is configured as a radially outer flange, and which can be configured analogously to the embodiment according to FIG. 1b, this means with protrusions 25 configured in radial direction at the inner circumference 28, which form in circumferential direction stop surfaces 26, 27 for the respective sprint units 19, 22. The view from the right onto the flange 23, 24 corresponds to the view in FIG. 1c, which is therefore not illustrated again separately. Thus, herein, the output component 14 is formed by the intermediary flange 24 while the input component 15 of the second damper 6.2 is formed by the output component 14 of the first damper 6.1, and thus by the floating flange 24, and the output component 16 of the second dampers 6.2 is formed by two drive disks, herein the drive disks 9.1 and 9.2, which are disposed in axial direction on both sides of the flange unit, includes of the two particular flanges 23, 24. Thus, the drive disk 9.2 is connected torque proof with the input component 11 of the predamper stage 4, for example, the damper assembly 7 or forms a portion thereof. The output component 12 is formed by a flange 43, the so-called predamper flange, which can be coupled torque proof with the connection element here e.g. through fastener elements 45, particularly provided as rivets. In the illustrated case, also here, the spring units 19 and 22 for the two dampers 6.1 and 6.2 of the damper assembly 5 are configured on a common diameter d. The spring units 19, 22 are configured as coil springs. The connection of the drive or the introduction of the torque into the flange 23 is performed through side plates 42.1 and 42.2, which are coupled to the flange in radial direction in the portion of the outer circumference of the flange 23 and enclose the damper assembly quasi bell shaped. The connection to the connection elements can be performed at the side plates 42.1 and 42.2, when an integration is performed into a drive train for vehicles. This is illustrated herein in an exemplary manner through the fastener elements 44.

In this embodiment, the torque is inducted through at least one of two additional side plates 42.1 and 42.2 through the primary flange 23 of the primary series damper, which primary flange is disposed on the outside in radial direction, this means of the damper assembly 5. Through the spring units 19 and 22, or the inward disposed floating flange 24, the moment is transferred to the drive disks 9.1 and 9.2, one of which is simultaneously provided as a side disk 37.2 of the predamper, this means of the damper assembly 7. The moment is introduced into the damper assembly 7 through the side disk and through the predamper flange 43 functioning as an output; it is introduced into a hub or another connection element. Also here, the particular respective input and output components 13, 14, 15, 16, 11, 12 are coupled to one another through torque transmission devices 17, 20, 35 and damping coupling devices 18, 21, 36 for the particular dampers 6.1, 6.2 or damper assemblies 5, 7. The torque transmission devices 17, 20, 35 and the damping coupling devices 18, 21, 36 are, for example, integrated in one component and formed by spring units 19 or 22 and 34.

A relative rotation angle limiter for the damper assembly 7 can be disposed at will, radially outside or alternatively inside the spring unit 34 of the pre damper, this means of the damper assembly 7 between the side surfaces and flange of the damper assembly 7.

The FIGS. 1 and 3 illustrate for the respective association of the functions with input and output components the disclosed embodiments. Other possibilities are also feasible, for example, with respect to the geometric configuration of the particular flanges and drive discs or side plates. Each of the illustrated embodiments can also be used after force flow reversal. The functions of the input components and output components are respectively exchanged with one another. The embodiments of the particular damper assembly are respectively free of a free angle or a relative rotation clearance. FIG. 1c illustrates the neutral condition.

Figure 4:
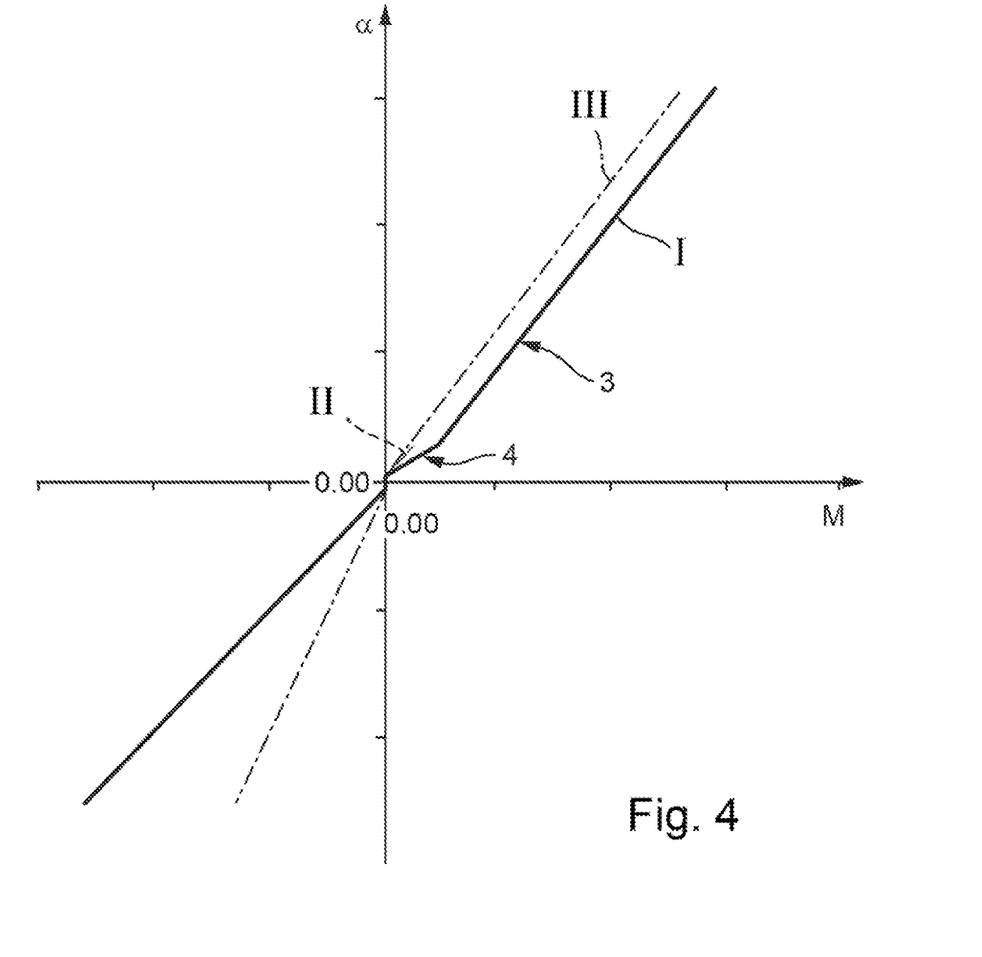
FIG. 4 illustrates the characteristic diagram of a multistage vibration damping device according to the invention in a simplified schematic depiction.

FIG. 4 illustrates the characteristic diagram I for a series connection of pre damper stage 4 and primary damper stage 3 for the embodiments according to the FIGS. 1 and 3. From this it is evident that a relatively flat characteristic curve is generated. For comparison the characteristic curves 2 and 3 are shown for the damper assembly 7 provided in the form of the pre damper and for the primary series damper provided in the form of the damper assembly 5 from the two dampers 6.1 and 6.2. Thus herein both rotation directions are illustrated the characteristic diagram for the pre damper is designated as II and the characteristic diagram for the primary series damper by itself is designated as 3 and the combined characteristic diagram of pre damper and primary series damper, this means damper assembly 5 and 7 is designated as I. From this it is evident that the entire characteristic diagram I for the primary series damper is configured flatter in the portion of smaller rotation angles due to using the pre damper stage 4 and that it is steeper only in the main operating range. Thus herein the torque M is plotted over the relative rotation angle α.

The configuration according to FIGS. 1 and 3 can be integrated into drive trains in various manners. One application is a force transmission device with a lock up clutch LU and with a hydrodynamic component, for example, in the form of hydrodynamic speed-/torque converter or a hydrodynamic clutch.

When integrated into the force transmission device the lock up clutch and the hydrodynamic component including at least one primary shell functioning as a pump shell and a secondary shell functioning as a turbine shell can be connected in the damper assembly in series to the transmission clutch and also to the hydrodynamic component. In this case the respective input component is connected to the output of the lockup clutch and also to the turbine shell of the hydrodynamic component. However, it is also feasible to configure the device according to the invention only as turbine damper, this means in series to the turbine shell or also as a normal torsion vibration damper in series with the lock up clutch. It is furthermore conceivable to integrate the damper unit in front of the lock up clutch into the force transmission device.

REFERENCE NUMERALS AND DESIGNATIONS

| | |
|---|---|
| 1 | vibration damping device |
| 2 | multistage series damper |
| 3 | first damper stage |
| 4 | second damper stage |
| 5 | damper assembly |
| 6.1, 6.2 | damper |
| 7 | damper assembly |
| 8 | input component |
| 9.1, 9.2 | drive discs |
| 10 | output component |
| 11 | input component |
| 12 | output component |
| 13 | input component |
| 14 | output component |
| 15 | input component |
| 16 | output component |
| 17 | torque transmission devices |
| 18 | damping coupling devices |
| 19 | spring unit |
| 20 | torque transmission device |
| 21 | damping coupling device |
| 22 | spring unit |
| 23 | intermediary flange |
| 24 | flange |
| 25 | protrusion |
| 26 | stop surface |
| 27 | stop surface |
| 28 | inner circumference |
| 29 | outer circumference |
| 30 | protrusion |
| 31 | side surface |
| 32 | side surface |
| 33 | recess |
| 34 | spring unit |
| 35 | torque transmission device |
| 36 | damping coupling device |
| 37.1, 37.2 | side disc |
| 38 | mounting element |
| 39.1, 39.2 | stop surface |
| 40.1, 40.2 | stop surface |
| 41 | opening |
| 42.1, 42.2 | side plate |
| 43 | pre-damper flange |
| 44 | mounting element |
| 45 | mounting element |
| R | rotation axis |
| M | torque |
| α | relative rotation angle |
| d | diameter |
| $d_4$ | diameter |
| E | input component |
| A | output component |

What is claimed is:

1. A vibration damper, comprising:
   at least one drive disc;
   a first damper assembly including:
      a first flange;
      a second flange having an outer circumference radially outward of the first flange;
      a first spring engaged with the at least one drive disc and the second flange; and, a second spring engaged with the first and second flanges; and, a second damper assembly including:

at least one output component; and, a third spring engaged with the first flange and the at least one output component, wherein:

the at least one drive disc comprises first and second side disks, offset relative to one another in axial direction, between which the first and second flanges are disposed;

the second flange is provided as an annular element with first protrusions extending in a portion of an inner circumference for the second flange in radial direction relative to a rotation axis;

the first flange is configured as an annular element with second protrusions oriented in radial direction in a portion of an outer circumference for the first flange; and, the first and second protrusions are disposed respectively at constant offsets relative to one another in circumferential direction, and form stop surfaces for the first and second springs.

2. The vibration damper according to claim 1, wherein the first and second damper assemblies are disposed in an axial plane.

3. The vibration damper according to claim 1, wherein an output component of the first damper assembly forms a unit with an input component of the second damper assembly.

4. The vibration damper according to claim 1, wherein:

the first damper assembly comprises at least two dampers (6.1, 6.2);

each of the dampers (6.1, 6.2) comprises an integral- or multipart input component (13, 15) and an integral- or multipart output component (14, 16), which are coupled to one another through the first and second springs and are rotatable relative to one another in circumferential direction; and, the input component (15) of the second damper (6.2) is formed by the output component (14) of the first damper (6.1).

5. The vibration damper according to claim 4, wherein the two dampers (6.1, 6.2) of the first damper assembly are disposed on a diameter (d).

6. The vibration damper according to claim 1, wherein the second damper assembly comprises two side disks (37.1, 37.2) disposed in axial direction and including openings (33) and wherein the first flange is disposed between side disks (37.1, 37.2).

7. The vibration damper according to claim 1, wherein an input component (8) of the first damper assembly is formed by the first and second side disks and an output component (10) is formed by the first or second flange.

8. The vibration damper according to claim 1, wherein:

the second damper assembly comprises two side disks (37.1, 37.2) disposed in axial direction; and, an output component (12) of the second damper assembly is formed by the side disks (37.1, 37.2), and an input component (11) is formed by the first flange.

9. A vibration damper, comprising:

at least one drive disc;

a first damper assembly including:

a first flange;

a second flange having an outer circumference radially outward of the first flange;

a first spring engaged with the at least one drive disc and the second flange; and, a second spring engaged with the first and second flanges; and, a second damper assembly including:

an output flange; and, a third spring engaged with the first flange and the output flange, wherein:

the at least one drive disc includes first and second side disks, offset relative to one another in axial direction, between which the first and second flanges are disposed;

the second flange is provided as an annular element with first protrusions extending in a portion of an inner circumference for the second flange in radial direction relative to a rotation axis;

the first flange is configured as an annular element with second protrusions oriented in radial direction in a portion of an outer circumference for the first flange; and, the first and second protrusions are disposed respectively at constant offsets relative to one another in a circumferential direction, and form stop surfaces for the first and second springs.

10. The vibration damper according to claim 9, wherein an input component of the first damper assembly is formed by the second flange, and an output component is formed by the first and second side disks.

11. The vibration damper according to claim 9, wherein:

the second damper assembly comprises third and fourth side disks disposed in axial direction;

an input component of the second damper assembly is formed by the third and fourth side disks;

an output component of the second damper assembly is formed by the output flange; and, at least one of the third or fourth side disks is connected torque proof with an output component of the first damper assembly, or forms a unit with the output component of the first damper assembly.

* * * * *